United States Patent
Lee et al.

(10) Patent No.: US 8,300,285 B2
(45) Date of Patent: *Oct. 30, 2012

(54) SCANNING CIRCUIT STRUCTURE

(75) Inventors: Kuan-Yu Lee, Taichung (TW);
Chen-Ho Lee, Hsinchu (TW)

(73) Assignee: Transpacific Systems, LLC,
Wilmington, DE (US)

(*) Notice: Subject to any disclaimer, the term of this patent is extended or adjusted under 35 U.S.C. 154(b) by 1235 days.

This patent is subject to a terminal disclaimer.

(21) Appl. No.: 11/694,472

(22) Filed: Mar. 30, 2007

(65) Prior Publication Data

US 2008/0030799 A1    Feb. 7, 2008

Related U.S. Application Data

(63) Continuation of application No. 10/064,265, filed on Jun. 27, 2002, now Pat. No. 7,315,406.

(51) Int. Cl.
*H04N 1/04*   (2006.01)
*H04N 1/32*   (2006.01)

(52) U.S. Cl. ........ 358/482; 358/483; 358/445; 358/474; 358/468; 358/442

(58) Field of Classification Search .......... 358/482, 358/483, 445, 442, 468, 434, 505, 512–514, 358/409, 412; 250/208.1, 234–236, 216, 250/208.2; 382/312, 318, 319; 399/211, 399/212; 716/108

See application file for complete search history.

(56) References Cited

U.S. PATENT DOCUMENTS

| | | | |
|---|---|---|---|
| 4,920,429 A | 4/1990 | Jaffe et al. | |
| 5,040,079 A | 8/1991 | Shimizu | |
| 5,239,387 A | 8/1993 | Stein et al. | |
| 5,483,357 A * | 1/1996 | Nagano | 358/483 |
| 5,594,468 A | 1/1997 | Marshall et al. | |
| 5,627,603 A | 5/1997 | Sakai | |
| 5,778,109 A | 7/1998 | Morigami | |
| 6,002,508 A | 12/1999 | Mai | |
| 6,084,691 A | 7/2000 | Tsai et al. | |
| 6,422,682 B1 | 7/2002 | Kaneko et al. | |
| 6,631,507 B2 * | 10/2003 | Shih et al. | 716/108 |
| 6,801,254 B1 | 10/2004 | Nishio | |
| 6,958,830 B2 * | 10/2005 | Kono | 358/443 |
| 7,315,406 B2 * | 1/2008 | Lee et al. | 358/482 |
| 7,336,402 B2 | 2/2008 | Moritaka | |
| 7,375,754 B2 * | 5/2008 | Miyazaki | 348/308 |
| RE40,644 E | 3/2009 | Omi | |
| 7,697,172 B2 * | 4/2010 | Ikeno et al. | 358/474 |
| 8,149,468 B2 * | 4/2012 | Okamoto | 358/409 |
| 2004/0196504 A1 * | 10/2004 | Kono | 358/300 |
| 2006/0176525 A1 * | 8/2006 | Mizuta et al. | 358/474 |
| 2007/0146821 A1 * | 6/2007 | Joh | 358/482 |
| 2008/0204826 A1 * | 8/2008 | Kimura | 358/497 |

FOREIGN PATENT DOCUMENTS

| | | |
|---|---|---|
| EP | 0568080 | 11/1993 |
| JP | 2002218185 A | 8/2002 |
| JP | 2003110798 A | 4/2003 |

* cited by examiner

*Primary Examiner* — Cheukfan Lee
(74) *Attorney, Agent, or Firm* — Stolowitz Ford Cowger LLP

(57) ABSTRACT

A scanning circuit having rearranged circuit modules at each end of a flat cable. After the rearrangement, the flat cable carries scanning control signals produced by a conventional IC communication interface instead of timing signals and carries digital image data instead of easily distorted and interfered analog image signals.

20 Claims, 1 Drawing Sheet

SCANNING CIRCUIT STRUCTURE

CROSS REFERENCE TO RELATED APPLICATIONS

This application is a continuation application of U.S. application Ser. No. 10/064,265, filed Jun. 27, 2002, and since issued as U.S. Pat. No. 7,315,406. The entire disclosure of U.S. application Ser. No. 10/064,265 is considered as being part of the disclosure of the present application and is hereby incorporated by reference herein in its entirety.

BACKGROUND OF THE INVENTION

1. Field of Invention

The present invention relates to a scanner. More particularly, the present invention relates to scanning circuit structure.

2. Description of Related Art

In recent years, rapid progress in digital technologies has lead to the development of Internet and multimedia systems. Accompanying this trend, a large number of analog images are routinely converted into a digital format to facilitate processing. A digital camera (DC) is used to extract an image from an actual scene. Similarly, an optical scanner is used to extract textual data from a document or image data from a picture. The extracted data is converted into a digital format so that a computer or electronic equipment may display an image, carry out an optical character recognition, edit the data, store up the data or simply output to some devices.

According to the method of inputting document image, optical scanners may be classified as a palmtop scanner, a sheet feed scanner, a drum scanner or a flatbed scanner. FIG. 1 is a diagram showing the circuit structure of a conventional scanner. As shown in FIG. 1, the circuit includes an optical sensor circuit module 120 and a main circuit module 110. Each circuit module is fabricated on a printed circuit board. The circuit modules 110 and 120 communicate with each other through a flat cable 130. In general, the main circuit module 110 is fixed inside the lower casing of a scanner while the optical sensor circuit module 120 is attached to a scanning module capable of moving longitudinally. The optical sensor circuit module 120 has a charge-coupled device 140 therein. The charge-coupled device 140 can sense the light reflected from the image within a scan document to produce analog image signals. The analog image signals are transmitted to the main circuit module 110 by a form of analog voltage signals through the flat cable 130. The main circuit module 110 processes the analog image signals and converts the analog image signals into digital image data, so as to provide a user to retrieve the digital image data file to carry out various operations including image display, optical character recognition, editing, data archiving or data transfer through a computer or other electronic device. In addition, to capture the image produced by the reflected light while scanning the document, the charge-coupled device 140 must receive timing control signals from the main circuit module 110 as well. Hence, the flat cable 130 must carry both timing control signals and analog image signals.

When demand for image quality is low, a flat cable is adequate because the quantity of image data that needs to be transferred is small. However, due to rapid expansion of computer power, the production of a high-quality scan image at a shorter scan period is always in demand. Eventually, to meet these demands, the flat cable has to carry greater quantities of analog image signals and timing control signals. In other words, the flat cable not only has to transmit signal at a higher rate, but also has to increase the number of transmission lines for transmitting timing control signals. The additional transmission lines for carrying control signals may cause electromagnetic interference (EMI) of analog image signals. Ultimately, image data may be distorted.

SUMMARY OF INVENTION

Accordingly, one object of the present invention is to provide a scanning circuit structure for a scanner capable of reducing distortion during high-speed image signal transmission so that electromagnetic interference is minimized and quality of transmitted image is improved.

To achieve these and other advantages and in accordance with the purpose of the invention, as embodied and broadly described herein, the invention provides a scanning circuit structure for a document scanner. The scanning circuit includes a main circuit module and an optical sensor circuit module. The main circuit module receives a scanning instruction from a communication interface and converts the scanning instruction into scan control signals. The scan control signals are passed to a connection cable. In the meantime, the main circuit module also receives digital image data of a scan document from the connection cable. The optical sensor circuit module is connected to the main circuit module via the connection cable. The optical sensor circuit module receives the scan control signals and converts the scan control signal into timing control signals. Hence, operations including the scanning of a document, the extraction of an analog image signal and the conversion of the analog image signal into a digital image data are executed in sequence.

In one embodiment of this invention, the main circuit module includes a main control logic unit, a memory unit and a memory control logic unit. The optical sensor circuit module includes an optical sensor, an analog front-end processor, an analog/digital converter and a timing signal generator. The main control logic unit in the main control module receives scanning instructions and converts the instructions into scanning control signals. The main control logic also receives digital image data scanned from a document. The memory unit stores digital image data. The memory control logic unit is coupled to the main control logic unit and the memory unit for controlling the access of digital image data. The optical sensor inside the optical sensor circuit module is used to sense an analog image signal that is formed by the light reflected from the document. The analog front-end processor is coupled to the optical sensor for pre-processing the analog image. The analog/digital converter is coupled to the front-end processor for converting the pre-processed analog image signal into digital image data. The timing signal generator is coupled to the optical sensor and the analog/digital converter for producing timing control signals, so as to control the scanning process on the document, produce the analog image signal of the document, and convert the analog image signal into the digital image data.

The main control logic unit in this invention also includes an image front-end processor for compensating and adjusting the captured digital image data so that the scanned image has a better quality. In general, the memory unit contains dynamic random access memory and the optical sensor is a charge-coupled device (CCD) or a CMOS image sensor. The connection cable linking the main circuit module and the optical sensor circuit module include a flat cable and the scanning circuit interfaces with a computer through a universal serial bus (USB). The scanning control signals are transmitted through an IIC or 3-wire IC communication interface.

In this invention, digital image data are transmitted instead of analog image signals. Furthermore, the scanning control signals are transmitted through a common IC communication interface instead of timing control signals transmitted through a connection cable. Through this arrangement, image data distortion due to high-speed transmission is greatly minimized. Hence, electromagnetic interference is minimized and quality of image transmitted by the scanner is improved.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
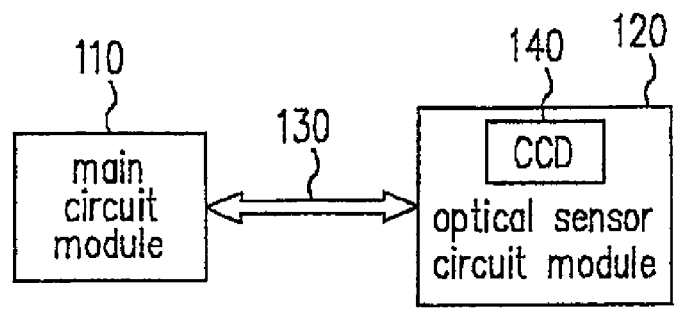
FIG. 1 is a diagram showing the circuit structure of a conventional scanner.

Reference will now be made in detail to the present preferred embodiments of the invention, examples of which are illustrated in the accompanying drawings. Wherever possible, the same reference numbers are used in the drawings and the description to refer to the same or like parts.

Figure 2:
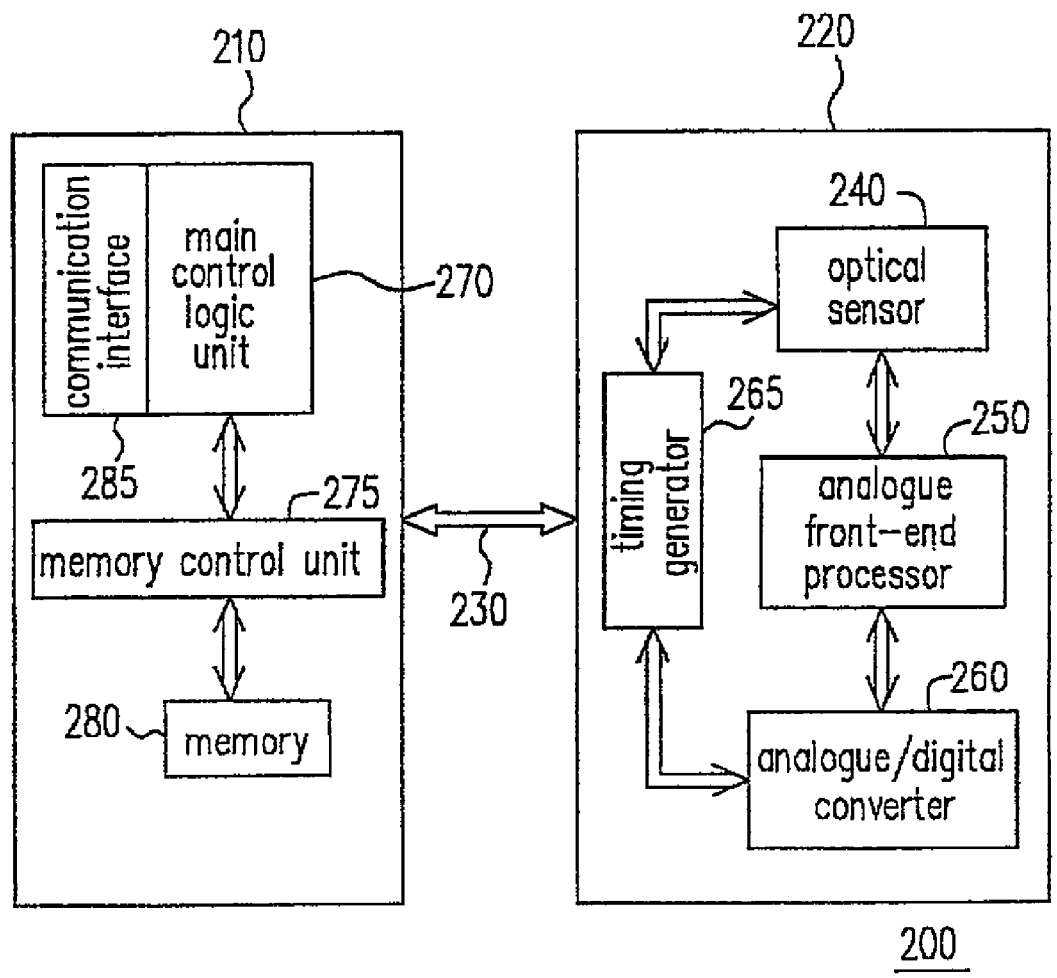
FIG. 2 is a diagram showing the circuit structure of a scanner according to one preferred embodiment of this invention.

FIG. 2 is a diagram showing the circuit structure of a scanner according to one preferred embodiment of this invention. As shown in FIG. 2, the scanning circuit 200 is responsible for controlling the entire process of scanning a document. The scanning circuit 200 includes a main circuit module 210 and an optical sensor circuit module 220. The main circuit module 210 and the optical sensor circuit module 220 are linked together through a connection cable 230 such as a flat cable. The flat cable carries both scan control signals and digital image data. The main circuit module 210 further includes a main control logic unit 270, a memory unit 280 and a memory control logic unit 275. The optical sensor circuit module 220 further includes an optical sensor 240, an analog front-end processor (AFE) 250, an analog/digital converter 260 and a timing signal generator 265.

The main control logic unit 270 in the main circuit module 210 connects with the human/machine interface of a personal computer (not shown) through a communication interface 285. Here, the communication interface 285 can be a universal serial bus (USB) interface or an enhanced parallel port (EPP) interface, for example. The communication interface 285 receives important scanning instructions regarding image resolution, brightness level and scanning range and converts the scanning instructions into scanning control signals that pass along the connection cable 230.

When the optical sensor circuit module 220 receives scanning control signals from the main circuit module 210, the timing generator 265 produces the required timing control signals for extracting an analog image signal from the optical sensor 240. The optical sensor 240 is a charge-coupled device (CCD) or a CMOS image sensor, for example. The captured analog image signal is preprocessed by the analog front-end preprocessor 250. Thereafter, the pre-processed analog image is transmitted to the analog/digital converter 260 and converted to digital image data. The digital image data is subsequently transmitted to the main circuit module 210 through the connection cable 230. At this moment, the data transmitted on the connection cable 230 is no longer the analog signal that easily has the distortion but is the digital image data that can be easily transmitted in a fast speed. As a result, it can effectively solve the issue about difficulty on maintaining the scanning quality when the scanning process is operated in the fast speed.

On receiving the digital image data, the main circuit module 210 transfers the data to the memory unit 280 via the memory controller 275. The memory unit 280 may contain conventional types of memory such as synchronous or non-synchronous dynamic random access memory (DRAM) or static random access memory (SRAM). Obviously, the main control logic unit 270 may incorporate an image preprocessor (not shown) for compensating and adjusting the captured digital image data so that the scanned image can have better quality. In addition, timing signals may have to be adjusted due to the change in connection between the communication interface of various integrated circuits (ICs).

In conclusion, major advantages of this invention include:

1. Since the flat cable transmits digital data instead of easily distorted analog image signals, a clearer image can be obtained at a higher scanning speed.

2. Since the flat cable transmits scanning control signals between conventional IC communication interfaces instead of timing control signals, the effect due to electromagnetic interference is greatly minimized.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. An optical scanning apparatus, comprising:
   communication means for receiving scan control signals from a main circuit module; and
   means for generating timing control signals for extracting an analog image signal in response to the received scan control signals, wherein the timing control signals are generated at an optical sensor circuit coupled to the main circuit module via the communication means, and wherein the received scan control signals do not comprise any timing control signals.

2. The apparatus of claim 1, further comprising:
   means for receiving a scanning instruction from a communication interface; and
   means for producing the scan control signals in response to the received Scanning instructions.

3. The apparatus of claim 2, wherein the scan control signals are produced at the main circuit module.

4. The apparatus of claim 3, further comprising means for converting the analog image signal into digital image data, wherein the scan control signals are transmitted to the sensor circuit module, and wherein the digital image is transmitted to the main circuit module.

5. The apparatus of claim 1, further comprising:
   means for extracting the analog image signal; and
   means for converting the analog image signal into a digital, wherein the digital image data is transmitted to the main circuit module via the communication means.

6. The apparatus of claim 5, further comprising:
means for generating the analog image signal at the optical sensor circuit module;
means for pre-processing the analog image signal at an optical sensor circuit module; and
means for converting the pre-processed analog image signal into the digital image data at the optical sensor circuit module, wherein the timing control signals that control a generation of the analog image signal and a conversion of the analog image signal into the digital image data at the optical sensor circuit module.

7. An apparatus, comprising:
a main circuit module;
a connection cable; and
an optical sensor circuit module coupled to the main circuit module through the connection cable, wherein the optical sensor circuit module is configured to:
receive scan control signals from the main circuit module; and
generate timing control signals for extracting an analog image signal in response to the received scan control signals, wherein the received scan control signals do not comprise any timing control signals.

8. The apparatus of claim 7, wherein the main circuit module is configured to:
receive scanning instruction associated with an image resolution, a brightness level, or a scanning range;
produce the scan control signals in response to the received scanning instruction; and
transmit the scan control signals through the connection cable.

9. The apparatus of claim 8 wherein the main circuit module comprises:
a main control logic unit configured to produce the scan control signals; and
a memory control logic unit coupled to the main control logic unit and configured to transfer digital image data to a memory unit.

10. The apparatus of claim 9 wherein the main control logic unit comprises an image pre-processor capable of compensating and adjusting the digital image data.

11. The apparatus of claim 7 wherein the optical sensor circuit module is further configured to:
extract an analog image signal captured in a document scanning operation from a document; and
convert the analog image signal into a digital image data, wherein the digital image data is transmitted through the connection cable.

12. The apparatus of claim 11 wherein the optical sensor circuit module comprises:
an optical sensor configured to generate the analog image signal;
an analog front-end processor coupled to the optical sensor and configured to pre-process the analog image signal;
an analog/digital converter coupled to the analog front-end processor and configured to convert the pre-processed analog image signal into the digital image data; and
a timing generator couples to the optical sensor and the analog/digital converter, wherein the timing generator configured to generate the timing control signals that control a generation of the analog image signal and a conversion of the analog image signal into the digital image data.

13. Scanning circuitry comprising an optical sensor circuit module operatively coupled to a main circuit module vie a connection cable, wherein the scanning circuitry is configured to:
receive scan control signals transmitted over the connection cable;
generate timing control signals in response to receiving the scan control signals, wherein the scan signals do not comprise any timing control signals; and
extract an analog image signal using the generated timing control signals.

14. The scanning circuitry of claim 13, further configured to:
receive a scanning instruction from a communication interface; and
produce the scan control signals in response to receiving the scanning instructions.

15. The scanning circuitry of claim 14, wherein the scanning instruction comprise an image resolution, a brightness level, or a scanning range, and wherein the scan control signals are produced in the main circuit module.

16. The scanning circuitry of claim 14, further configured to convert the analog image signal into digital image data, wherein the scan control signals are transmitted to the optical sensor circuit module, and wherein the digital image data is transmitted to the main circuit module.

17. The scanning circuitry of claim 13, further configured to:
extract the analog image signal;
convert the analog image signal into a digital image data; and
transmit the digital image data via the communication cable.

18. The scanning circuitry of claim 17, further configured to:
pre-process the analog image signal; and
convert the pre-processed analog image signal into the digital image data prior to the transmission of the digital image data via the communication cable.

19. The scanning of circuitry of claim 17, further configured to generate timing control signals that control a generation of the analog image signal and the conversion of the analog image signal into the digital image data.

20. The scanning circuitry of claim 13, further configured to:
generate the analog image signal;
pre-process the analog image signal; and
convert the pre-processed analog image signal into the digital image data, wherein the generated timing control signals control a generation of the analog image signal and a conversion of the analog image signal into the digital image data.

* * * * *

UNITED STATES PATENT AND TRADEMARK OFFICE
CERTIFICATE OF CORRECTION

PATENT NO. : 8,300,285 B2
APPLICATION NO. : 11/694472
DATED : October 30, 2012
INVENTOR(S) : Lee et al.

It is certified that error appears in the above-identified patent and that said Letters Patent is hereby corrected as shown below:

In Column 4, Line 55, in Claim 2, delete "Scanning instructions." and
insert -- scanning instruction. --, therefor.

In Column 4, Line 60, in Claim 4, delete "sensor" and insert -- optical sensor --, therefor.

In Column 4, Line 61, in Claim 4, delete "image" and insert -- image data --, therefor.

In Column 4, Line 65, in Claim 5, delete "into a digital," and
insert -- into digital image data, --, therefor.

In Column 5, Line 4, in Claim 6, delete "at an" and insert -- at the --, therefor.

In Column 5, Line 8, in Claim 6, delete "that control" and insert -- control --, therefor.

In Column 5, Line 46, in Claim 11, delete "an" and insert -- the --, therefor.

In Column 5, Line 48, in Claim 11, delete "a digital" and insert -- digital --, therefor.

In Column 5, Line 51, in Claim 12, delete "11" and insert -- 11, --, therefor.

In Column 6, Line 1, in Claim 12, delete "couples" and insert -- coupled --, therefor.

In Column 6, Line 3, in Claim 12, delete "configured" and insert -- is configured --, therefor.

In Column 6, Line 8, in Claim 13, delete "vie" and insert -- via --, therefor.

In Column 6, Line 13, in Claim 13, delete "scan" and insert -- scan control --, therefor.

Signed and Sealed this
Second Day of April, 2013

Teresa Stanek Rea
*Acting Director of the United States Patent and Trademark Office*

CERTIFICATE OF CORRECTION (continued)
U.S. Pat. No. 8,300,285 B2

In Column 6, Line 19, in Claim 14, delete "receive a scanning instruction" and insert -- receive scanning instructions --, therefor.

In Column 6, Line 24, in Claim 15, delete "instruction" and insert -- instructions --, therefor.

In Column 6, Line 35, in Claim 17, delete "into a" and insert -- into --, therefor.

In Column 6, Line 37, in Claim 17, delete "via the" and insert -- via a --, therefor.

In Column 6, Line 45, in Claim 19, delete "of circuitry" and insert -- circuitry --, therefor.

In Column 6, Line 46, in Claim 19, delete "generate" and insert -- generate the --, therefor.

In Column 6, Line 53, in Claim 20, delete "into the" and insert -- into --, therefor.